United States Patent [19]
Dech

[11] Patent Number: 5,732,793
[45] Date of Patent: Mar. 31, 1998

[54] TREE DECH

[76] Inventor: Edwin F. Dech, 525 D School Rd., Nayareth, Pa. 18064

[21] Appl. No.: 607,292

[22] Filed: Feb. 26, 1996

[51] Int. Cl.[6] ........................................ A45F 3/26
[52] U.S. Cl. ................................ 182/187; 182/92
[58] Field of Search ..................... 182/187, 188, 182/92; 248/217.3

[56] References Cited

U.S. PATENT DOCUMENTS

| | | | |
|---|---|---|---|
| 3,731,956 | 5/1973 | Hanley | 248/221.12 |
| 4,113,058 | 9/1978 | Kobosh | 182/187 |
| 4,600,081 | 7/1986 | Wade | 182/187 |
| 4,727,961 | 3/1988 | Dawson | 182/187 |
| 4,730,700 | 3/1988 | Miller | 182/187 |
| 4,928,793 | 5/1990 | Westimayer | 182/187 |
| 5,518,083 | 5/1996 | Blennert | 182/188 |

FOREIGN PATENT DOCUMENTS 364612  11/1922  Germany ............... 248/217.3

*Primary Examiner*—Alvin C. Chin-Shue

[57] ABSTRACT

A tree dech including a gusset. The gusset has a back wall with a pair of structures that extend outwardly. The back wall has a front face, a back face and a top end with a keyhole that is positioned over a lag bolt that is screwed within a tree trunk. The pair of structures each have a base and a pair of sides. The base is positioned along the back face of the back wall and adjacent a top edge of the top end. Lastly, a plate is positioned over the gusset and supported by the gusset. The plate, on the gusset, is capable of supporting a hunter.

1 Claim, 3 Drawing Sheets

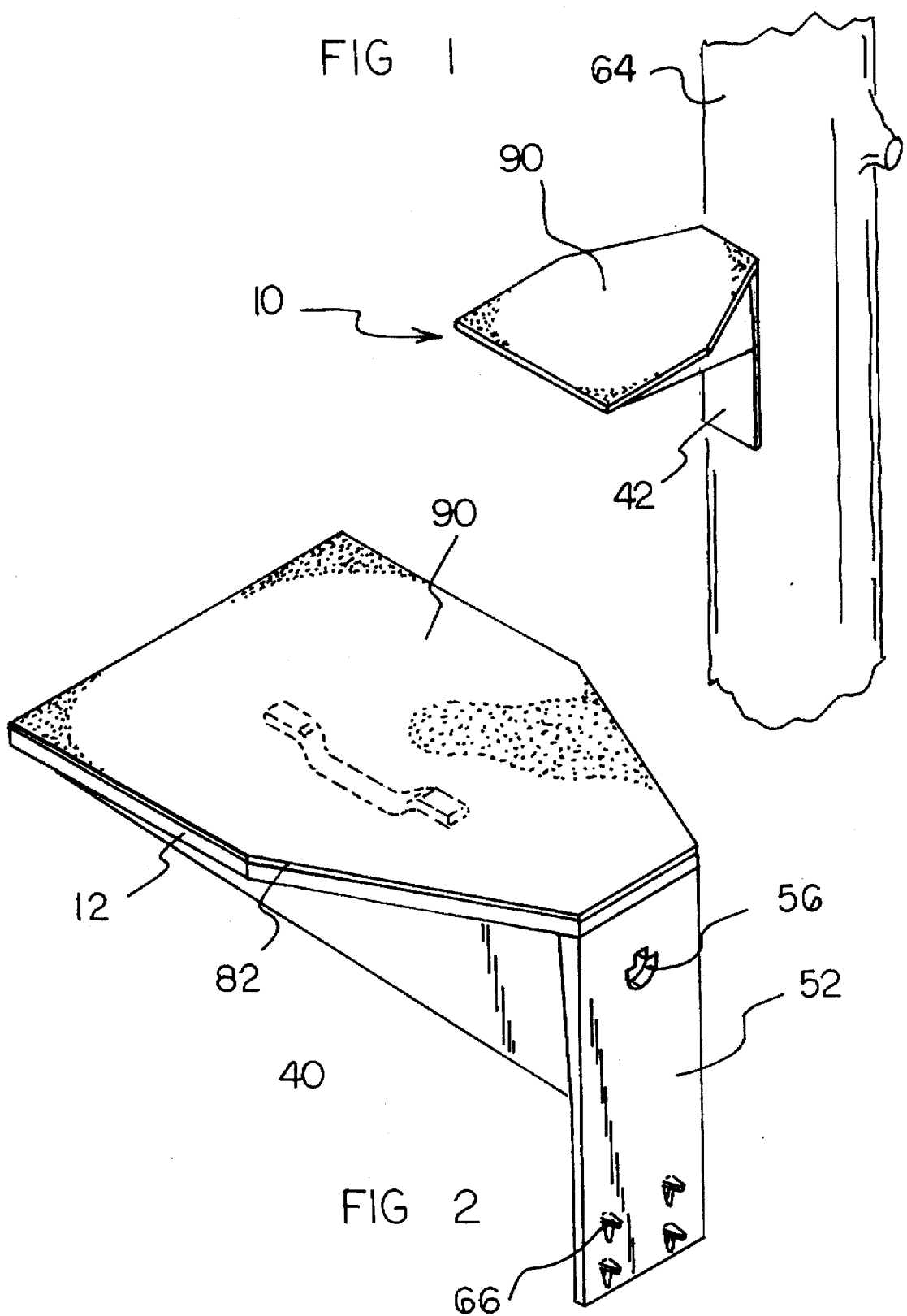

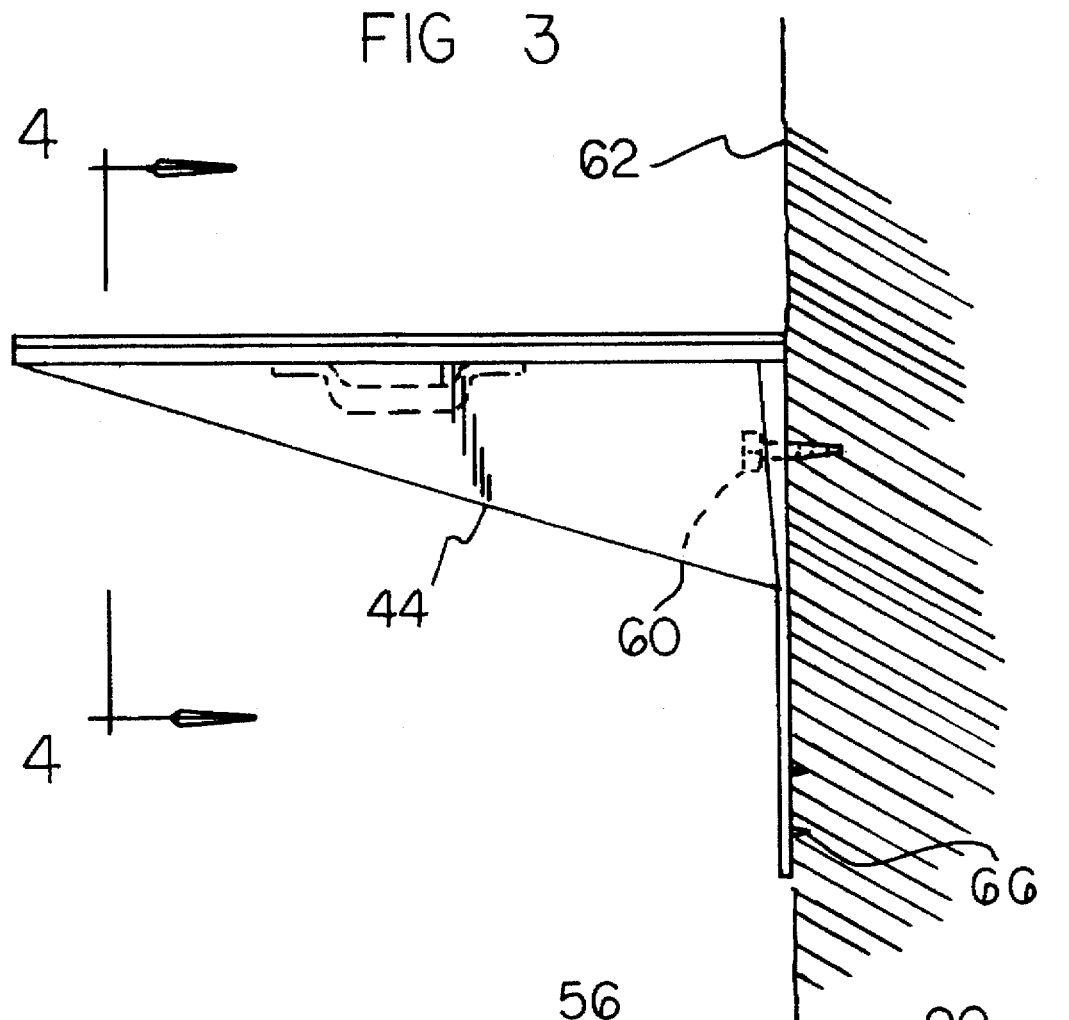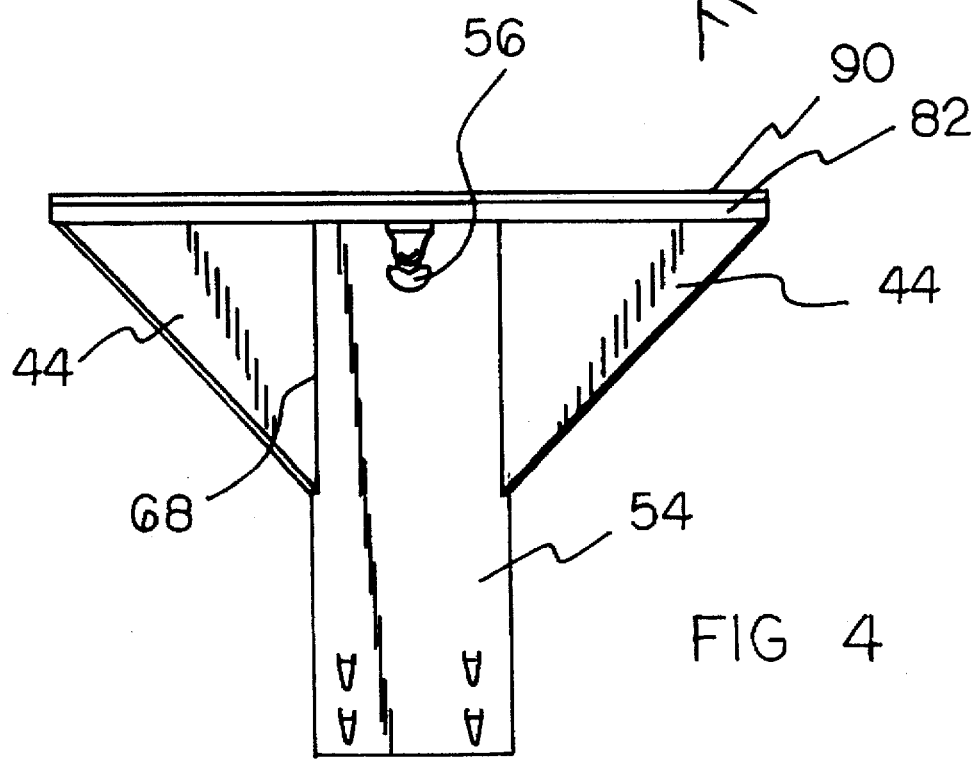

TREE DECH

BACKGROUND OF THE INVENTION

1. Field of the Invention

The present invention relates to a tree dech and more particularly pertains to providing a temporary attachment to a tree trunk for use by a hunter in a standing or sitting position, and further providing a non-slip surface on a plate covering the gusset of the tree dech.

2. Description of the Prior Art

The use of a tree stand is known in the prior art. More specifically, a tree stand heretofore devised and utilized for the purpose of elevating a hunter are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,316,105 to Reggin and Zamzow discloses a portable tree stand for deer hunting. U.S. Pat. No. 5,339,922 to Beechler discloses a tree stand for hunters. U.S. Pat. No. 4,600,082 to Rauls discloses a foldable hunting seat. U.S. Pat. No. Des. 270,474 to Haines, Hazenar and Herolzer discloses a tree stand for hunters. U.S. Pat. No. 4,782,918 to Brunner et al. discloses a portable collapsible tree stand. Lastly, U.S. Pat. No. 4,721,183 to Koniecka discloses a tree seat.

While these devices fulfill their respective, particular objectives and requirements, the aforementioned patents do not describe a tree dech that allows a hunter to position himself above the ground while on a hunting trip by standing on the tree dech when the dech is attached to the trunk of the tree, and the dech with a non-slip surface on a plate portion of the tree dech.

In this respect, the tree dech according to the present invention substantially departs from the conventional concepts and designs of the prior art, and in doing so provides an apparatus primarily developed for the purpose of providing a temporary attachment to a tree trunk for use by a hunter in a standing or sitting position, and further providing a non-slip surface on a plate covering the gusset of the tree dech.

Therefore, it can be appreciated that there exists a continuing need for a new and improved tree dech which can be used for providing a temporary attachment to a tree trunk for use by a hunter in a standing or sitting position, and further providing a non-slip surface on a plate covering the gusset of the tree dech. In this regard, the present invention substantially fulfills this need.

SUMMARY OF THE INVENTION

In view of the foregoing disadvantages inherent in the known types of a tree stand now present in the prior art, the present invention provides an improved tree dech. As such, the general purpose of the present invention, which will be described subsequently in greater detail, is to provide a new and improved tree dech and method which has all the advantages of the prior art and none of the disadvantages.

To attain this, the present invention essentially comprises a gusset. The gusset has a back wall with a pair of triangular structures extending outwardly therefrom. The back wall has a top end, a bottom end and a decreasing width therebetween. The width is three and one-eight inches along the top and decreasing by thirty-three and one-third percent to two and one-eight inches. The back wall has a front face and a back face. The top end has a keyhole that is positioned therethrough and spaced from a top edge of the back wall. The keyhole is capable of being positioned over a lag bolt that is screwed within a tree trunk of a tree. The back end has a plurality of spikes that extend from the front face of the back wall to assist in securing the back wall to the tree truck. Additionally, the pair of triangular structures each have a base and a pair of sides with a converging point. The base of each triangular structure is positioned along the back face of the back wall and adjacent the top edge. The base of each triangular structure is attached along the top end of the back wall to form a sixty degree angle along a horizontal. The gusset has a chain lock positionable around the gusset when the gusset is positioned against the tree trunk. A hexagon plate is provided. The plate has a rigid solid structure. The plate has a length of twenty-one inches and a width for positioning over the gusset and supported by the gusset. The plate has a front edge and a back edge. The plate is capable of supporting a hunter in a standing position when the gusset is positioned against the tree. Lastly, a hexagon pad that is flexible is provided. The pad has a non-slip upper surface and is attached to the plate when the plate is positioned on the gusset. The pad allows the hunter's feet to be secured thereon when the hunter is standing on the pad.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tree dech which has all of the advantages of the prior art a tree stand and none of the disadvantages.

It is another object of the present invention to provide a new and improved tree dech which may be easily and efficiently manufactured and marketed.

It is further object of the present invention to provide a new and improved tree dech which is of durable and reliable constructions.

An even further object of the present invention is to provide a new and improved tree dech which is susceptible of a low cost of manufacture with regard to both materials and labor, and which accordingly is then susceptible of low prices of sale to the consuming public, thereby making such tree dech economically available to the buying public.

Still yet another object of the present invention is to provide a new and improved tree dech which provides in the apparatuses and methods of the prior art some of the advantages thereof, while simultaneously overcoming some of the disadvantages normally associated therewith.

Even still another object of the present invention is to provide a tree dech for providing a temporary attachment to a tree trunk for use by a hunter in a standing or sitting position, and further providing a non-slip surface on a plate covering the gusset of the tree dech.

Lastly, it is an object of the present invention to provide a new and improved tree dech including a gusset. The gusset has a back wall with a pair of structures that extend outwardly. The back wall has a front face, a back face and a top end with a keyhole that is positioned over a lag bolt that is screwed within a tree trunk. The pair of structures each have a base and a pair of sides. The base is positioned along the back face of the back wall and adjacent a top edge of the top end. Lastly, a plate is positioned over the gusset and supported by the gusset. The plate, on the gusset, is capable of supporting a hunter.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof, Such description makes reference to the annexed drawings wherein:

FIG. 1 is a perspective view of the preferred embodiment of the tree dech constructed in accordance with the principles of the present invention.

FIG. 2 is an isometric view of the present invention as shown in FIG. 1.

FIG. 3 is a side view of the present invention in an operable configuration.

FIG. 4 is a cross sectional view of the present invention taken along line 4—4 of FIG. 3.

The same reference numerals refer to the same parts through the various Figures.

DESCRIPTION OF THE PREFERRED EMBODIMENT

Figure 5:
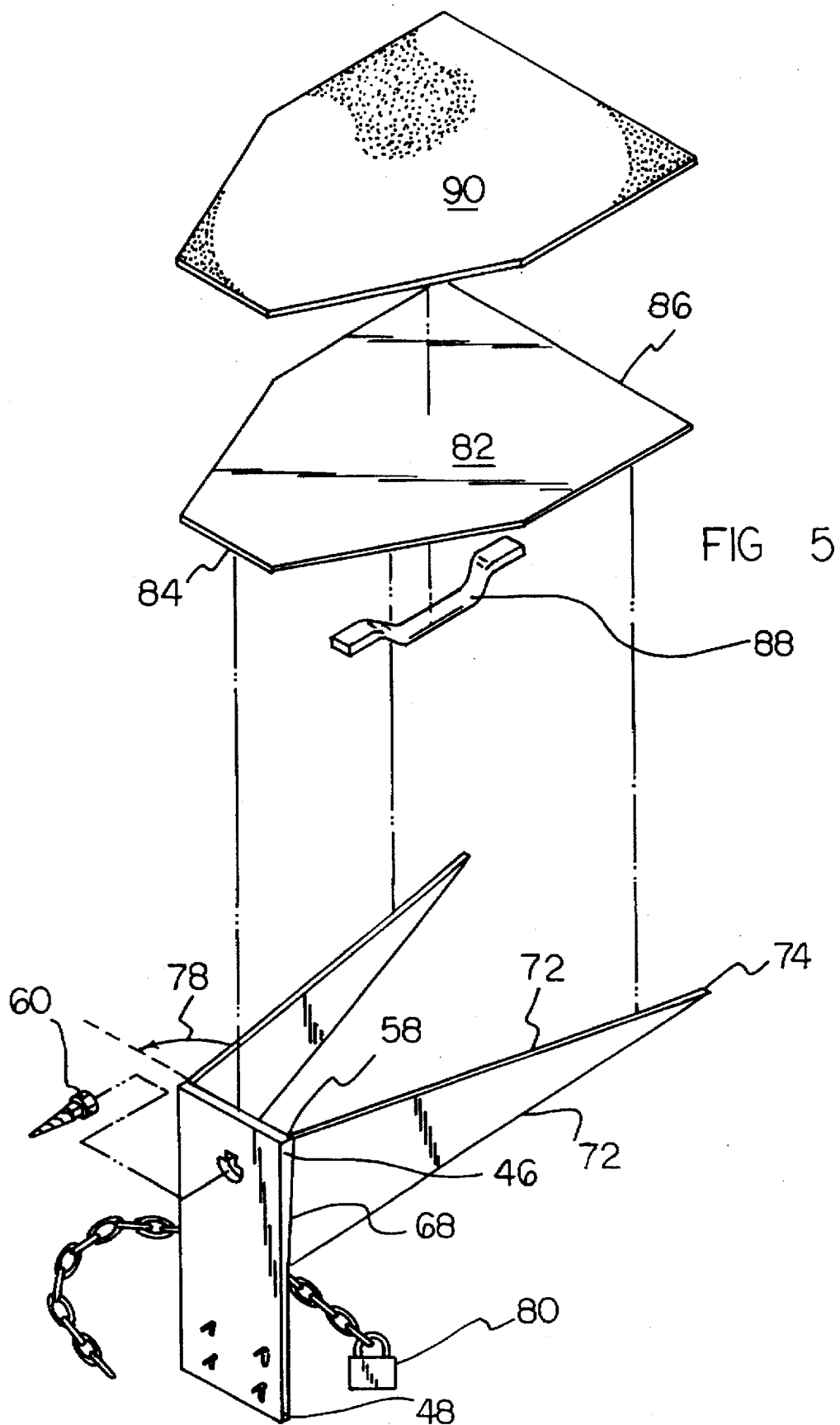
FIG. 5 is an exploded view of the operable component of the present invention.

With reference now to the drawings, and in particular to FIG. 1 thereof, the preferred embodiment of the new and improved tree dech embodying the principles and concepts of the present invention and generally designated by the reference numeral 10 will be described.

The present invention, the tree dech 10 is comprised of a plurality of components. Such components in their broadest context include a gusset, a plate and a pad. Such components are individually configured and correlated with respect to each other so as to attain the desired objective.

Specifically, as best illustrated in FIG. 2, a gusset 40 is included. The gusset has a back wall 42 with a pair of triangular structures 44 extending outwardly therefrom. The gusset, as shown in FIG. 5, is formed of aluminum, because the material is durable and strong. The back wall has a top end 46, a bottom end 48 and a decreasing width therebetween, as shown in FIG. 3. The width is three-eighth inches along the top and decreasing by thirty-three and one-third percent to two-eighth inches. The increased width of the back wall at the top end allows the pair of supports to support greater weight.

The back wall 42 has a length of about eleven inches and has a rectangular shaped. The back wall has a front face 52 and a back face 54. The top end has a keyhole 56 that is positioned therethrough and spaced from a top edge 58 of the back wall. The keyhole, as shown in FIG. 3, is capable of being positioned over a lag bolt 60.

The lag bolt is screwed into the trunk 62 of a tree 64. The lag bolt has a minimum length of three inches with a diameter of one-half inch. The head of the lag bolt has a diameter of three-fourths inch. The lag bolt is screwed completely into the tree trunk and leaves about one-half inch of the lag bolt exposed. It is important that the lag bolt have this length for stability of the tree dech when attached to the tree. FIG. 1 shown the positoning of the gusset when attached to the tree trunk.

Additionally, the back end 48 has a plurality of triangular spikes 66 that extend from the front face of the back wall 42. The triangular spikes assist in securing the back wall to the tree truck 62. The spikes are formed of punchouts made in the back wall of the gusset. The spikes are punched out through the back wall proportionately along the bottom end. This allows the the pointed portion of the triangula spike to extend beyond the front face of the back wall, as seen in FIG. 2, to secure the back wall.

The pair of triangular structures 44, of the gussett, each have a base 68 and a pair of sides 72 with a converging point 74, as shown in FIG. 5. The base of each triangular structure is positioned along the back face 54 of the back wall 42 and adjacent the top edge 58. The base of each triangular structure is attached along the top end of the back wall to form a sixty degree angle along a horizontal at 78.

Included is a chain lock 80 positioned around the gusset when the gusset 40 is positioned against the tree trunk. The chain lock is positioned around the gusset as security for the tree dech. Securing the tree dech with the chain lock allows the hunter to leave the tree dech when it is necessary to track the animal. Also, the chain lock provides additional support of the gusset onto the tree trunk. This additional support increases the safety of the tree dech.

As best illustrated in FIG. 5, a hexagon plate 82 is provided. The hexagon plate is a rigid solid structure. The plate, as shown in FIG. 5, has a length of twenty-one inches and a width for positioning over the gusset 40 when the gusset is secured to the tree trunk. The angle, of each triangular structure with respect to the back wall, allows the structure to support the plate on the gusset 40. The width of the plate increases from a front edge 84 to a back edge 86.

The plate is formed of a rigid metal or metal allow, preferably aluminum. The plate has a handle spot welded to one side of the plate. The handle allows the hunter to easily lift the plate onto the gusset. The plate is capable of supporting a hunter in a standing position when the gusset 40 is attached to the tree 64. FIG. 4 shows the cross sectional view of the plate positioned on the gusset.

Lastly, a hexagon pad 90 is provided. The pad is formed of a rubberized material that is flexible and has a non-slip upper surface. The pad is attached to the plate when the plate is positioned on the gusset 40. The pad allows the hunter to have secured footing when the hunter stands on the tree dech. The pad and plate may be replace if damaged through wear and tear or any other means.

The present invention provides an easy to use tree dech that can be positioned against a tree above the ground. The hunter, once placement of the tree dech has occurred, can stand or sit on the tree dech. The top surface of the tree dech has a rubberized pad that is a non-slip or skid resistant-type pad. Because the tree dech is made of lightweight materials it is easy and safe to use when the hunter goes on a hunting trip. The tree dech has very few components which makes it a no-thinker for the hunter to position the tree dech against the tree and attach it to the tree trunk. The tree dech is secured mainly by a lag bolt and spikes. The tree dech uses leverage by increasing the width of the back wall of the gusset to allow the tree dech to support more weight. When the hunter is finished his hunting trip or wishes to move the tree dech it is very easy. The hunter only needs to unscrew the lag bolt from the tree trunk and carry the tree dech to a different tree and rescrew the lag bolt into the new tree.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved tree dech for temporary attachment to a tree trunk for use by a hunter comprising in combination:

a gusset having a back wall with a pair of triangular structures extending outwardly therefrom, the back wall having a top end, a bottom end and a decreasing width therebetween, the width being $3/8$ inches along the top end and decreasing by $33 1/3$ percent to $2/8$ inches, the width of $3/8$ inches along the top end being greater than the width of the bottom end for allowing a greater amount weight to be supported, the back wall having a front face and a back face, the top end having a key hole positioned therethrough and spaced from a top edge of the back wall, the key hole capable of being positioned over a lag bolt screwed within a trunk of a tree, the bottom end having a plurality of triangular spikes extending from the front face of the back wall for assisting in securing the back wall to the tree trunk;

the lag bolt being screwed into the trunk of a tree, the lag bolt has a minimum length of three inches with a diameter of one-half inch, the head of the lag bolt having a diameter of three-fourths inch, the lag bolt being screwed completely into the tree trunk, the lag bolt leaving about one-half inch of the lag bolt exposed for providing stability of the gusset when attached to the tree;

the pair of triangular structures with each triangular structure having a base and a pair of sides with a converging point, the base of each triangular structure being positioned along the back face of the back wall and adjacent the top edge, the base of each triangular structure being attached along the top end of the back wall forming a 60 degree angle along a horizontal;

a chain lock being positionable around the gusset when the gusset being positioned against the trunk of the tree for securing the gusset to the tree and allowing it to remain in position;

a hexagon plate being a rigid solid structure, the plate having a length of 21 inches and a width for positioning over the gusset, the plate capable of being supported by the gusset, the plate having a front edge and a back edge, the plate being capable of supporting a hunter in a standing position when the gusset being positioned on the tree;

a handle being spot welded to the plate; and a hexagon pad being flexible and having a non-slip upper surface, the pad being attached to the plate when the plate being positionable on the gusset, the pad being coextensive the plate, the pad being capable of allowing secured footing of the hunter standing thereon.

* * * * *